Oct. 14, 1958   F. L. ANDREW ET AL   2,856,317
SMOOTH HYDROPHOBIC FILM OF DECREASED COHESIVENESS
Filed Feb. 21, 1957
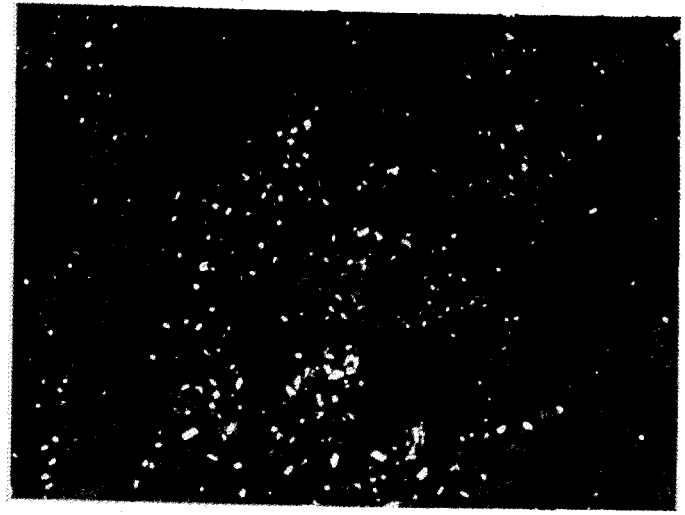
INVENTORS.
FREDERICK L. ANDREW
EMIL A. VITALIS
BY
ATTORNEY

United States Patent Office 2,856,317
Patented Oct. 14, 1958

2,856,317

SMOOTH HYDROPHOBIC FILM OF DECREASED COHESIVENESS

Frederick L. Andrew, Glenbrook, and Emil A. Vitalis, Springdale, Conn., assignors to American Cyanamid Company, New York, N. Y., a corporation of Maine Application February 21, 1957, Serial No. 641,608

5 Claims. (Cl. 117—138.8)

The present invention relates to non-tacky smooth hydrophobic organic films of decreased cohesiveness. More particularly, the invention relates to non-tacky smooth hydrophobic films carrying on at least one surface thereof a small amount of cyanuric acid microcrystals as agent decreasing the cohesiveness of the film.

The term "cohesion" is employed in this specification to designate the tendency of films of hydrophobic organic material to remain united when lightly pressed together.

As the result of recent developments in the polymer art over the past two decades there have become available to the packaging and wrapping industry a variety of hydrophobic organic films. These films do not possess any significant tackiness yet generally tend to cohere when more or less firmly pressed together and particularly when stored in the form of stacked sheets or rolls. This cohesiveness appears to be chiefly the result of the nearly optical smoothness of the film material and most probably is caused by molecular association of the sheets, although the effect of static may be a contributing factor.

The bond which develops is a surprisingly strong one and sheets of film which have been laid on top of each other are practically impossible to separate by opposed pulling in horizontal plane. Modern high speed printing and packaging machines generally cannot be operated at rated speeds when supplied with cut film stock having a tendency to cohere, and this is often the case when the film is supplied in the form of rolls.

The discovery has now been made that smooth hydrophobic organic film carrying on at least one surface a small amount of cyanuric acid in dispersed microcrystalline form possesses decreased cohesiveness. Sheets of such film, when laid on top of each other and pressed firmly together, are thus more readily separated than would otherwise be the case. It is a particular advantage of the invention that the cyanuric chloride does not adversely affect the heat sealing properties of thermoplastic film.

Among the films exhibiting decreased cohesiveness when carrying cyanuric acid in dispersed micro-crystalline form are cellulose acetate, Mylar (a glycol terephthalic acid ester), Pliofilm, polyvinyl chloride, and Saran (a thermoplastic vinylidene chloride polymer) films. The cohesiveness of lacquered cellophane (regenerated cellulose film carrying on both sides a continuous film of nitrocellulose lacquer) as well is decreased by cyanuric acid. From this it appears that substantially all normally cohesive hydrophobic organic film possesses decreased cohesiveness when carrying cyanuric acid microcrystals as described.

The film of the present invention may be produced by forming a dilute solution of cyanuric acid,

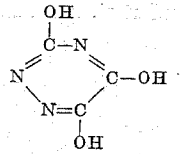

immersing the film in the solution (or otherwise wetting the film therewith), and evaporating the liquid so that the cyanuric acid crystals are in micro-precipitated form, i. e., so that crystals of cyanuric acid are precipitated in nearly invisible form as the layer of liquid on the film dries. The solution may also be applied by roll or by spray, and preliminary tests indicated that topical application (in the form of spaced dots) may also be satisfactory.

The liquid employed as solvent may be any volatile organic liquid which dissolves at least about 0.5% by weight of cyanuric acid and which is harmless to the film being treated. Cyanuric acid is difficultly soluble in water and in most of the common substantially inert volatile organic solvents. We have found, however, that solutions containing 0.5%–1.5% of cyanuric acid by weight can be prepared by the use of 3-amino-1-propanol, morpholine, diethylamine, methyl carbitol (monomethyl ether of diethylene glycol), methyl propyl carbitol (methyl propyl diether of diethylene glycol), dioxane, glycerol, glycol, and methyl Cellosolve (2-methoxyethanol) as solvents. Organic liquids generally possess low surface tension and this facilitates distribution of the cyanuric acid on the film as the applied solution dries.

Water is preferred as the solvent because of its cheapness and lack of odor and flammability. Its solvent power for cyanuric acid is increased by the addition of a small amount of a water-soluble nitrogen base and ammonia, trimethylamine, diethylenetetramine are suitable for the purpose. Elevated temperatures promote the solvent action of the liquid and the solution may be applied at any temperature which does not harm the film. The surface tension of aqueous solutions of cyanuric acid may be decreased by addition of an inert volatile organic liquid including methyl carbitol and methanol, resulting in more uniform distribution of the cyanuric acid as the film dries. The surface tension may also be decreased by addition of a wetting agent. Suitable wetting agents include the sodium long chain alkyl sulfonates, the sodium long chain fatty alcohol sulfates, the sodium dialkyl sulfosuccinates, the higher primary alkyl amine-ethylene oxide condensates, and the higher N-alkyl pyridinium chlorides. The monoalkyl succinates, particularly disodium octadecyl succinate, are non-toxic and give excellent results and are therefore preferred.

The amount of cyanuric acid which is present on the film has not been determined numerically but is evidently extremely small as the material is not noticed when the treated film is viewed by the unassisted eye and does not change the handle or "feel" of the film except to decrease its cohesiveness. The minimum effective amount in any one instance depends chiefly on the intrinsic cohesiveness of the particular film the surface tension of the treating solution, and the rate at which the treated film is allowed to dry, a faster rate of drying usually appearing to improve the action of the deposited cyanuric acid. Moreover, the relative humidity of the air appears to be a factor, film intended for use in dry environment generally needing somewhat more cyanuric acid for equivalent decrease in cohesiveness than film intended for use in humid areas. A suitable test method to determine this minimum effective amount is shown in the examples below. In practice, we have found that aqueous solutions containing 1.3% by weight of cyanuric acid and a preponderant amount of organic solvent applied as described below give very satisfactory results.

One embodiment of the invention is illustrated in the drawing, which is a photomicrograph by polarized light at 150 diameter of water-white cellulose acetate film treated according to the present invention. The film was prepared by treatment with a 1% solution of cyanuric acid in a 10% water-90% methyl Cellosolve mixture applied by the method of Example 1 below. The microcrystals of cyanuric acid can clearly be seen on the surfaces of the film. The dimensions of the crystals appear to be predominantly in the range $0.01\mu$–$5\mu$.

The manner in which the cyanuric acid acts as anti-cohesive has not been determined, and we do not wish to be limited by any theory. Cyanuric acid, however, appears to be a specific for the purpose as a wide variety of other organic compounds have been tried for the purpose without significant benefit.

The invention will be more particularly described in the examples which follow. These examples illustrate specific embodiments of the invention and are not to be construed as limitations thereon.

Example 1

The following illustrates a preferred method according to the present invention of preparing hydrophobic films carrying cyanuric acid microcrystals as anti-cohesive.

A stock cyanuric acid treating solution was prepared by mixing 13 parts by weight of cyanuric acid, 100 parts by weight of water, and 887 parts by weight of methyl Cellosolve (2-methoxyethanol), heating the mixture to 85° C. until the cyanuric acid had dissolved, and cooling the solution to room temperature.

Sheets of commercial film shown in the table below were immersed in the solution individually so that both sides were thoroughly wetted. The sheets were then folded, put through padder rolls, unfolded, and hung to air dry.

The films when dry were substantially unchanged in appearance, no cyanuric acid being visible. The films were tested to determine their cohesiveness under a pressure of 10 oz. per square inch as follows: Test strips 2″ wide and 6″ long were cut from the sheets and tested in pairs by overlapping their ends longitudinally, placing a cylindrical laboratory 500-gm. weight 1.5″ in diameter on the two layers of the film thus formed, manually pulling the strips without removing the weight so as to cause them to separate by sliding over each other, and estimating the difference in effort required to cause separation against the effort required in the case of controls prepared from untreated film.

Results were rated on the arbitrary scale wherein 0 designates no improvement over the pull required to separate the respective control sheets; 1 designates a slight improvement over the respective controls; 2 represents a major improvement over the controls; and 3 represents the elimination of substantially all cohesiveness, the strips sliding freely apart.

Results are as follows:

| No. | Film | Cohesiveness Rating [1] |
|---|---|---|
| 1 | Cellulose acetate | 3 |
| 2 | Mylar [2] | 2 |
| 3 | Regenerated cellulose film, nitrocellulose lacquered on both sides | 3 |
| 4 | Polyvinyl chloride | 2 |
| 5 | Saran [3] | 3 |

[1] Improvement over untreated control.
[2] Terephthalic acid glycol ester.
[3] Vinylidene chloride-vinyl chloride copolymer.

Example 2

The effect of the concentration of cyanuric acid in the treating solution on inhibiting the cohesiveness of Saran film was determined by repeating the procedure of Example 1, except that the concentration of cyanuric acid in each test was varied as shown in the following table.

| Run No. | Cyanuric Acid Concentration,[1] percent | Cohesiveness Rating [2] |
|---|---|---|
| 1 | 0.2 | 0 |
| 2 | 0.5 | 2 |
| 3 | 1.0 | 3 |
| 4 | 1.3 | 3 |
| 5 [3] | 2.0 | 2 |

[1] Based on weight of solution.
[2] See Example 1.
[3] Treating bath was used at 90° C. to keep the cyanuric acid in solution.

A plot of the foregoing results indicates that a concentration of cyanuric acid between about 0.75% and 1.5% by weight in the treating solution yields best results.

Example 3

The following illustrates the effectiveness of various organic liquids as the solvent medium. The treating solutions were prepared and tested as shown in Example 1, using Saran as the test film. Each treating bath contained 10% by weight of water and the amount of cyanuric acid shown in the table below, the organic solvent shown below constituting the remainder of the solution.

| Solvent | Cyanuric Acid, percent [1] | Cohesiveness Rating [2] |
|---|---|---|
| Methyl carbitol | 1.43 | 3 |
| Methyl propyl carbitol | 1.0 | 3 |
| Propylene glycol monophenyl ether | 0.32 | 2 |
| Butyl Cellosolve | 0.26 | 2 |
| Dioxane | 1.2 | 3 |
| Methyl Cellosolve | 1.35 | 3 |

[1] Based on weight of treating solution.
[2] See Example 1.

The results indicate that the principal inert organic solvents are about equally effective, the amount of cyanuric acid in the solution being of greater importance.

We claim:

1. Smooth hydrophobic organic film carrying on at least one surface thereof in dispersed microcrystalline form a small but effective amount of cyanuric acid as agent decreasing the cohesiveness of said film.

2. Smooth cellulose acetate film carrying on at least one surface thereof in dispersed microcrystalline form a small but effective amount of cyanuric acid as agent decreasing the cohesiveness of said film.

3. Smooth vinylidene chloride-vinyl chloride copolymer film carrying on at least one surface thereof in dispersed microcrystalline form a small but effective amount of cyanuric acid as agent decreasing the cohesiveness of said film.

4. Smooth terephthalic acid-glycol ester film carrying on at least one surface thereof in dispersed microcrystalline form a small but effective amount of cyanuric acid as agent decreasing the cohesiveness of said film.

5. Smooth polyvinyl chloride film carrying on at least one surface thereof dispersed microcrystalline form a small but effective amount of cyanuric acid as agent decreasing the cohesiveness of said film.

References Cited in the file of this patent

UNITED STATES PATENTS

| | | |
|---|---|---|
| 2,331,715 | Nadeau et al. | Oct. 12, 1943 |
| 2,729,637 | Gable et al. | Jan. 3, 1956 |
| 2,768,167 | Marzluff et al. | Oct. 23, 1956 |